United States Patent [19]

Eitzinger et al.

[11] Patent Number: 4,669,598
[45] Date of Patent: Jun. 2, 1987

[54] CARROUSEL TYPE ASSEMBLY MACHINE

[75] Inventors: Robert Eitzinger; Kimber T. Vought, both of Wheeling, Ill.

[73] Assignee: Mid-West Automation, Inc., Wheeling, Ill.

[21] Appl. No.: 773,553

[22] Filed: Sep. 9, 1985

[51] Int. Cl.⁴ .............................................. B65G 21/20
[52] U.S. Cl. .................................. 198/345; 198/465.2
[58] Field of Search ................... 198/345, 465.1, 465.2, 198/468.1, 580, 740, 772, 795, 803.01; 104/162

[56] References Cited

U.S. PATENT DOCUMENTS 2,789,683  4/1957  Stahl ................................ 198/465.2
3,478,859  11/1969  Krempel et al. ................. 198/465.1

Primary Examiner—Joseph E. Valenza

[57] ABSTRACT

An assembly machine, carrousel in design, so as to provide a succession of work stations with each station serviced by an independent pallet. Each pallet, by synchronization, is clamped in a work station, released, and transferred linearly into a succeeding station where it is once again clamped into position by a cam operated pallet transferring and locking mechanism.

12 Claims, 5 Drawing Figures

4,669,598

CARROUSEL TYPE ASSEMBLY MACHINE

BACKGROUND OF INVENTION

Assembly machines of the type herein disclosed are utilized in machining operations covering numerous type of work pieces, where it is the common practice to mount the work pieces on a pallet and to clamp and transfer the pallet over rails into successive work stations. With such machines it is required that there be employed at each station a means for accurately locating and firmly clamping the pallet in place. By synchronized action the pallets are released from their clamp station and transferred linearly over a track into a succeeding work station.

Prior assemblies have disclosed hydraulic, gears and spring arrangements for accomplishing the required transfer and clamping operation, all of which are costly, inefficient by reason by lack of uniformity and action, and require extensive and complicated drive mechanisms. These prior assemblies have included belted pallets which have been found to be mechanically cumbersome and inefficient. See for example the disclosures of U.S. Pat. Nos. 3,636,783 and 3,968,869 as well as U.S. Pat. No. 4,313,260.

SUMMARY OF THE INVENTION

The present invention achieves the desired results and at the same time eliminates the need for the cumbersome and complicated mechanisms disclosed in the prior art.

This invention consists of a beltless pallet associated with a cam operated functioning mechanism wherein each pallet is accurately moved in a linear direction about a carrousel designed frame structure with each pallet being located and clamped in operative position within a designated work station.

The present structure provides for a plurality of transfer pins reciprocally movable longitudinally throughout their length for insertion into receiving apertures formed in the back wall of each pallet. These transfer pins are all interconnected with certain designated transfer pins that are carried by a block slidable in directions transverse to the pins axes. A cam operated stroke lever moves the pin bearing block between pallet stations and thus when the transfer pins are in contact with the pallet the latter will be caused to move linearly in a continuous path around the carrousel track.

To secure each pallet in a workable position within each work station there is provided a number of locking pins which extend parallel to said transfer pins, yet have independent longitudinal movement.

A scissor like assembly consisting of a pair of cross arms centrally pivoted about a vertical axis is provided for imparting longitudinal movement of said transfer and locking pins. When the cross arms are caused to pivot relative to each other with a scissorslike action the pins carried by the free ends of the arms will be reciprocally moved relative to the pallet. This scissors-like action of the cross arms is produced through a cam operated control lever. The free end of one of the cross arms is connected to the transfer pins while the free end of the other cross ram is connected to the locking pins. By this arrangement the independent longitudinal movement of such pins is determined by the scissorslike movement of the arms acting in response to the cam operation.

BRIEF DESCRIPTION OF THE DRAWINGS

The invention will be best understood by reference to the accompanying drawings which illustrate the preferred form and mode of operation by which the objects of the invention are achieved and in which.

GENERAL DESCRIPTION

Figure 1:
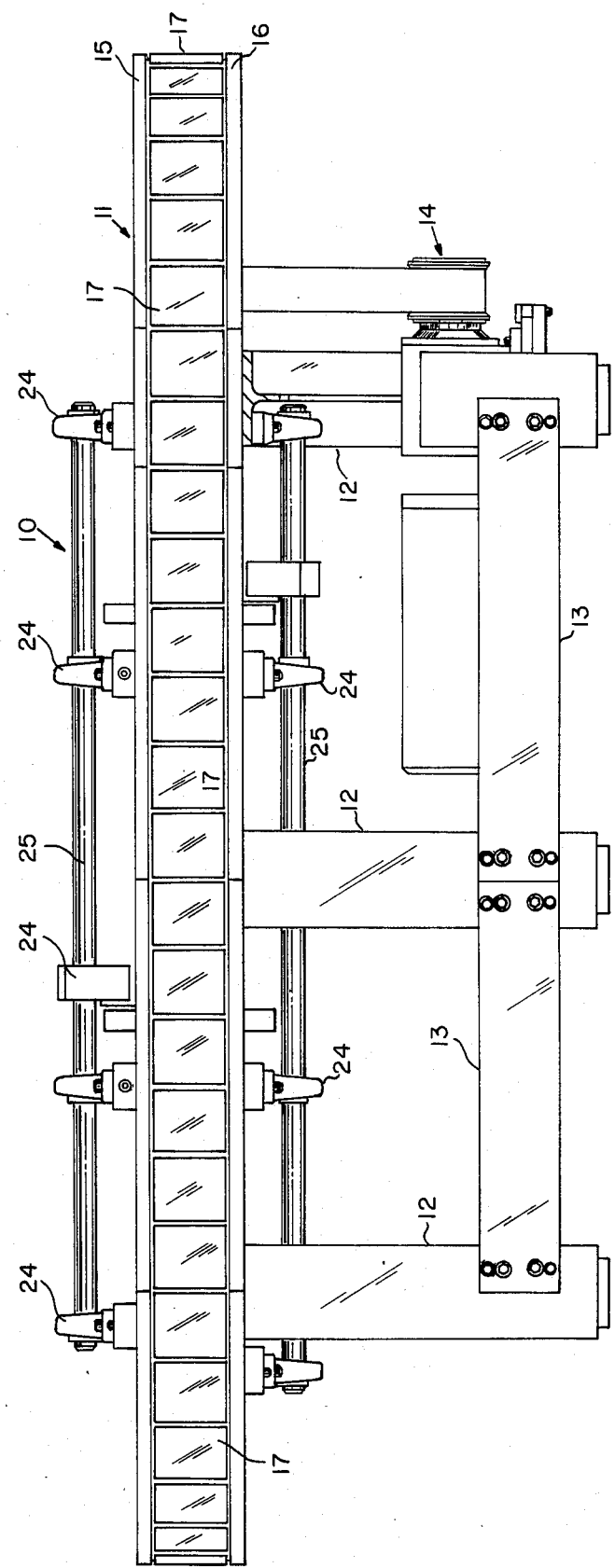
FIG. 1 is a side elevational view of the carrousel type assembly machine.

As illustrated in FIG. 1 the machine 10 includes a carrousel table top structure 11 supported by a series of legs 12 secured together by braces 13. A power source 14 is located between an end pair of legs as shown.

The carrousel type structure 11 is defined by upper and lower track members 15 and 16 between which independent pallets 17 are movably supported.

Figure 2:
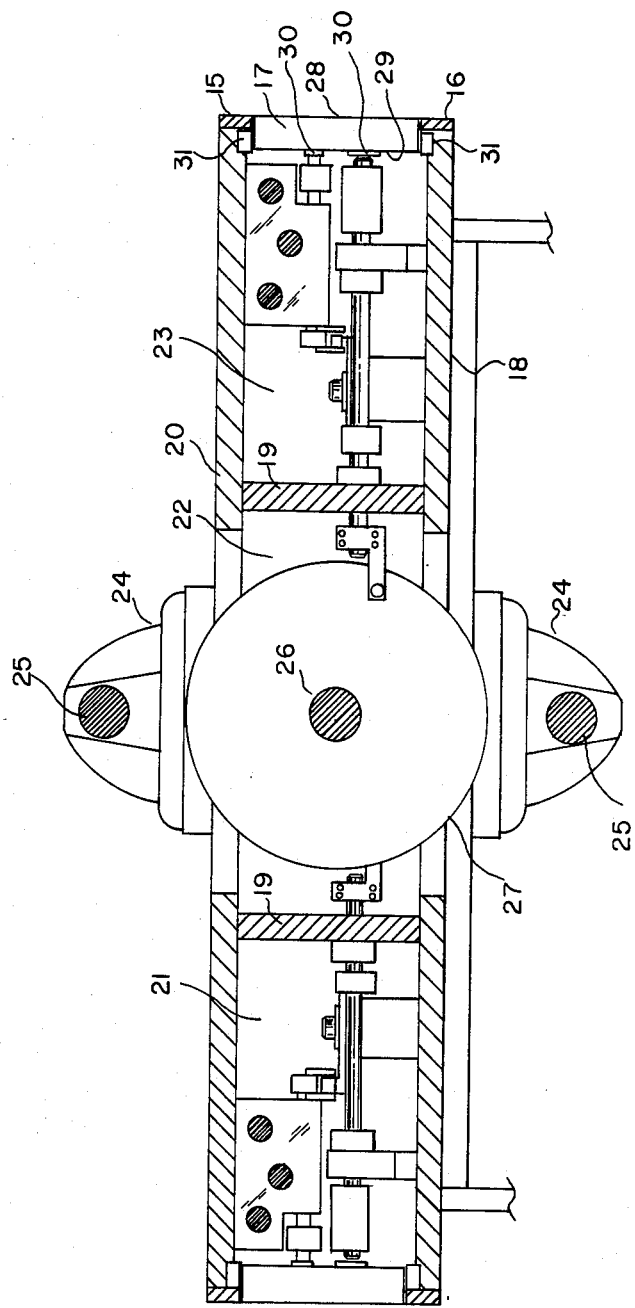
FIG. 2 is a detailed sectional view showing the structural arrangement by which movement of the transferring and locking pins are accomplished.

FIG. 2 discloses that in addition to the tracks 15 and 16 the carrousel top structure includes a lower deck 18 that by partitions 19 support an upper deck 20, dividing the top structure into separate elongated compartments 21, 22 and 23.

Centrally located above and beneath the center compartment 22 is a number of brackets 24 joined together by stabilizing rods 25. Extending throughout the length of the compartment 22 is a rotatable drive shaft 26 that in turn rotatably supports a series of cams 27, one of which is shown in FIG. 2. It should be noted that there will be an appropriate number of cams 27 as there are modulars of the asembly.

Each pallet 17 as depicted in FIG. 2 is rectangularly shaped so as to present a flat exposed face 28 and a rear facial surface 29 upon which are mounted receiving bosses 30. Rollers 31 support the pallet 17 for movement relative to the track members 16 and 17.

Figure 4:
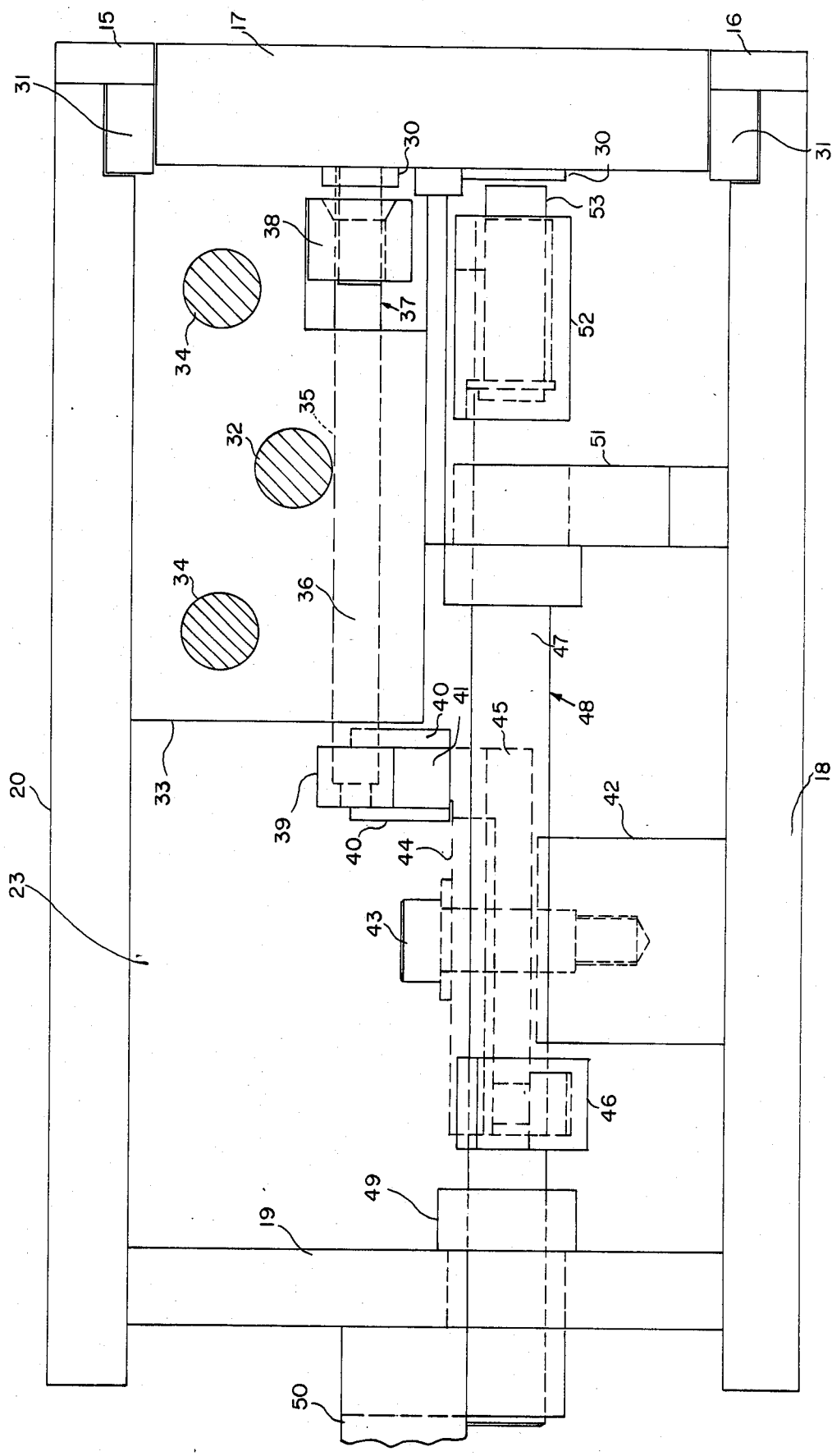
FIG. 4 is a fragmentary detailed sectional view of the pin arrangement.

As each corresponding side compartments 21 and 23 are alike and contain the identical structural members only one compartmentized unit, as shown in FIG. 4, will be described. All other units will bear the same reference number indicating like structural parts.

In FIG. 4 the compartment 23 has extending therethrough a stroke shaft 32. Fixedly mounted on this shaft 32 is a pair of transfer blocks 33, joined together by connecting rods 34. Each transfer block 33 has formed therethrough a bore 35 that slideably contains the elongated shank 36 of a transfer pin 37. As shown in FIG. 4 one lower outside corner of the transfer block 33 is notched and within that recess is an enlarged head 38 of the transfer pin 37.

Figure 3:
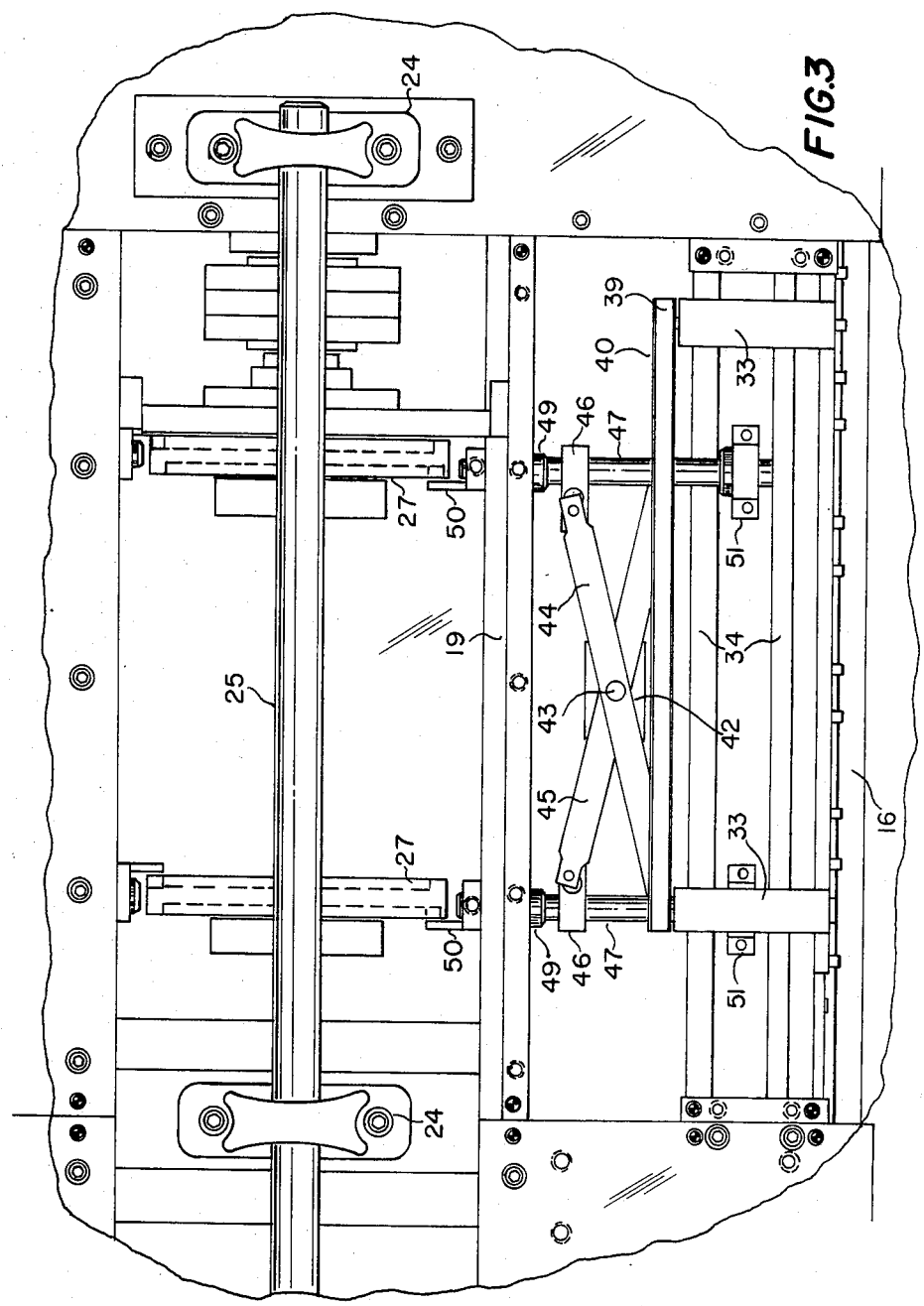
FIG. 3 is a fragmentary top plan view of the pin moving mechanism.

The opposite end of the shank 36 of the transfer pin 37 is fixedly journalled in an elongated connecting bar 39 that extends between the spaced apart transfer blocks 33 as shown in FIG. 3. The connecting bar 39 has attached thereto a pair of depending rails 40 which freely embrace a circular bearing head 41.

Within the compartment 23 and supported by the lower deck 18 is a pivot stand 42, that by pivot pin 43, movably sustains a pair of cross arms 44 and 45. Each of the free ends of the cross arms 44 and 45 carry a bearing head 41 which are disposed between the rails 40 carried by the connecting bar 39. The opposite ends of each of the cross arms 44 and 45 are pivotly attached to a base 46 that in turn is fixedly journalled upon the shank 47 of a locking pin 48.

The shank 47 of the locking pin 48 extends through a bushing 49 and provides at its inner free end a cam follower 50. The cam follower 50 which is disposed in the middle compartment 22 is adapted to ride in a cam groove formed in the face of the circular cam 27.

The shank 47 of the locking pin 48 is journalled through a guide post 51 and supports a head 52 which includes a projecting pin head 53.

Figure 5:
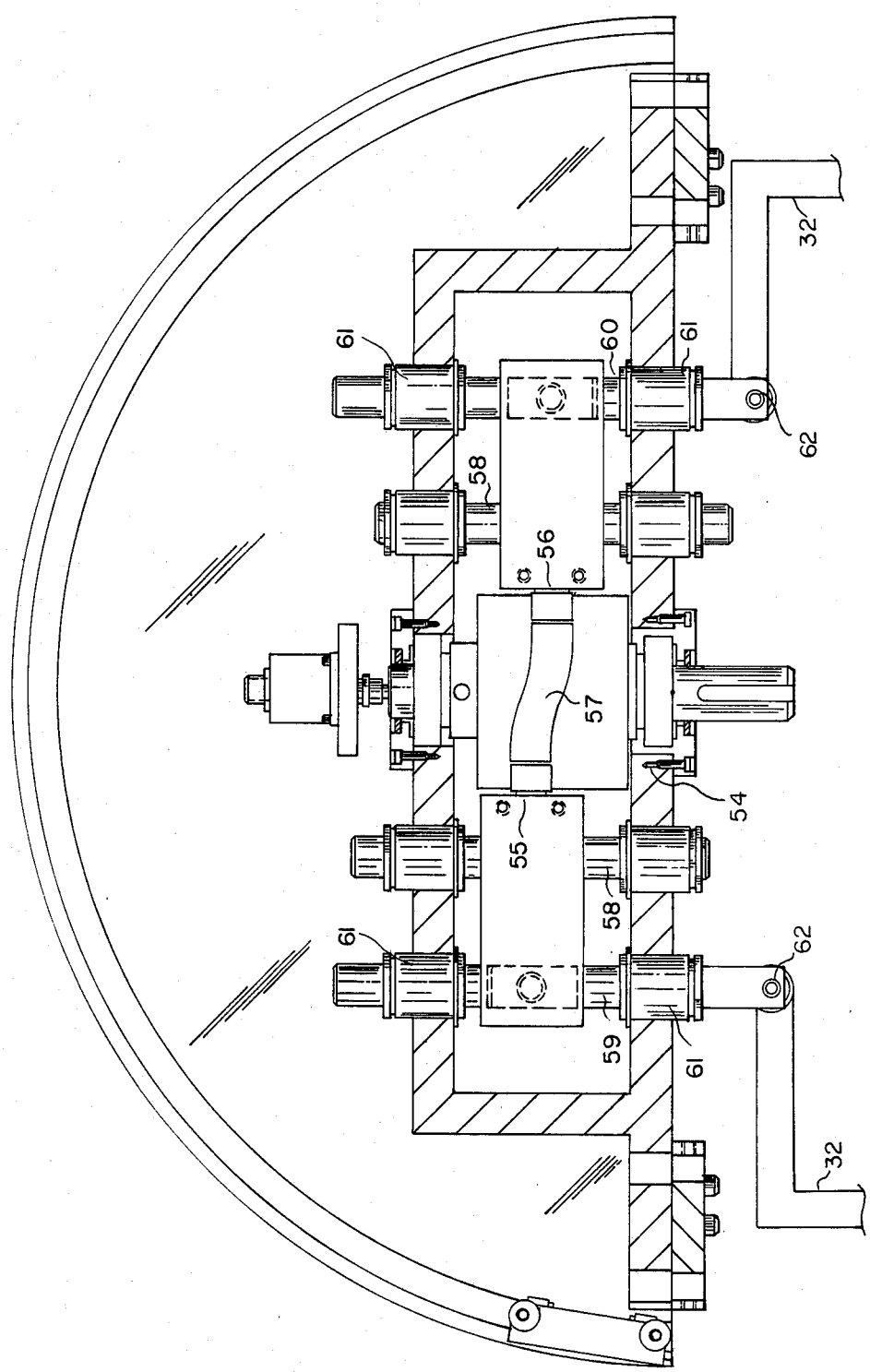
FIG. 5 is a fragmentary detailed sectional view of a drive mechanism of this invention.

The construction of one curved end of the carrousel table top structure is delineated in FIG. 5. The tracks proscribe a semi-circular path, the degree of curvation being calculated to accept the rollers 31 of each of the independent pallets 17.

Within the table-like structure and operatively connected in any conventional manner to the power source 14, is a rotatable drum cam 54. A pair of cam followers 55 and 56 are in engagement with a cam groove 54 formed in the drum cam 54. These followers 55 and 56 are freely supported on rods 58 while being fixedly attached to shafts 59 and 60 which, are in turn, freely journalled in bearing 61. These shafts 59 and 60 are attached as at 62 to the end of of the stroke shaft 32. Thus upon rotation of the drum cam 54 and the initiated movement of the cam followers 55 and 56 the stroke shaft 32 will reciprocally move axially through the compartment 23 in a plane parallel to the track. This stroke shaft movement will impart reciprocal movement to the transfer block 33 permitting the like movement of the connecting bar 39 relative to the bearing heads 41.

When it is desired to move each independent pallet 17 over the track members 15 and 16 into a successive work station, the shifting of the transfer pins 36 and the movement of the clamping pins 48 are synchronized to act as follows:

As controlled by the cam 27, the clamping pin 48 is adapted to be moved axially into and out of contact with the boss 30 on the pallet 17. Such clamping pin 48 must be inserted into the boss 30 on the pallet 17 during the non-transferring movement of the transfer pin 36 and transfer block 33 by the stroke shaft 32. This is accomplished when one notes that as viewed as FIG. 4, when the clamping pin 48 moves left to right, it will pivot the cross arms 44 and 45 about the pivot 43, so that their free ends with the bearing head 41 carried thereby shifts in an opposite direction right to left. The movement of the bearing head 41 will cause the connecting bar 39 to likewise shift thus causing the shifting of the transfer pins 36, right to left, into their retracted position with respect to the pallet 17.

The stroke shaft 32 will then move the transfer block 33 and the transfer pins 36 in a linear direction without cooresponding movement of the pallet 17. The linear movement of the stroke shaft 32 and transfer block 33 is effected by the drum cam 54.

When the pallets 17 are to be moved from one station to another, the cam 27 will move the clamping pins 48 right to left out of contact with the pallet 17, as viewed in FIG. 4. This direction of movement will cause the cross arms 44 and 45 to pivot in a reverse direction, to effect the shifting of the connecting bar 39 and the transfer pins 36 carried thereby in a left to right direction, into the position shown in FIG. 4. In such new position, when the stroke shaft 32 is moved by the cam 54, the pallet 17, being in contact with the transfer pins 36, will be moved into the next work station. It should be noted that as the transfer block 33 is moved in either direction by the stroke shaft 32 the bearing heads 41 will be free to ride between the rails 40 of the connecting bar 39.

By properly designed dwell periods, the cams 26 and 54 are made to synchronize the movement of the respective effective parts. The length of the stroke of the stroke shaft 32 is in direct proportion to the width of the pallet 17. The shifting and axial movement of the transfer pins 36 and clamping pins 48 need only be in the range of $\frac{1}{4}$ to $\frac{1}{2}$ inches.

From the foregoing there has been described a pallet transferring and clamping mechanism that is simple in construction, economical in manufacture and highly effective in use.

Having thus described the invention what is claimed as new and desire to be protected and secured by Letters Patent is:

1. An assembly machine having a carrousel table-like top structure adapted to service a plurality of linearly spaced work stations comprising:
   (a) a continuous track encircling the table-like top structure so as to define a linear pallet path thereabout,
   (b) a plurality of disconnected pallets each having independent contact with said track for movement thereover,
   (c) a pallet transfer means movable from a retracted position into an operative position wherein said transfer means contact each of said disconnected pallets for transferring them over said track into successive work stations,
   (d) means including a pair of cross arms pivoted scissors-like about a common center pivot for reciprocally shifting said pallet transfer means in a direction transverse to the direction of travel of said pallets, with the ends of said cross arms movable in opposite directions and having one end of each of said cross arms in contact with said pallet transfer means for axially shifting the same into and out of a retracted and operative position with respect to said pallets,
   (e) a reciprocating stroke means for moving said transfer means with said pallets in one direction over said track when said transfer means is shifted by pivotal movement of said cross arms into its operative position with respect to said pallets and for moving only said transfer means in an opposite direction when it is shifted by the opposite pivotal movement of said cross arms into its retracted position with respect to said pallets,
   (f) means for clamping said pallets in a work station during the period when said reciprocating stroke means is moving said transfer means in its retracted position in an opposite direction, and
   (g) means for moving said pallet transfer means and said clamping means in synchronization for transfering and clamping each individual pallet in a selected linearly spaced work station.

2. An assembly machine as defined claim 1 wherein said pallet transfer means comprise elongated pin members reciprocally shiftable axially in a direction transverse to the direction of movement of said pallets over said track into and out of contact with said pallets.

3. An assembly machine as defined by claim 1 wherein said reciprocating stroke means comprises an elongated shaft movable co-planar with respect to the direction of movement of said pallets over said tracks, with the movement of said stroke shaft being in response to a rotatable cam.

4. An assembly machine as defined by claim 3 wherein said pallet transfer means comprise elongated pin members reciprocally shiftable axially in a direction transverse to the direction of movement of said pallets over said track into and out of contact with said pallets.

5. An assembly machine as defined by claim 1 wherein said means for clamping said pallets in a work station comprises elongated clamping pins movable axially in a direction transverse to the direction of movement of said pallets by said pallet transfer means, said clamping pins movable in response to a cam synchronized with the movement of said means for reciprocally shifting said pallet transfer means.

6. An assembly machine as defined by claim 5 wherein said pallet transfer means comprise elongated pin members reciprocally shiftable axially in a direction transverse to the direction of movement of said pallets over said track into and out of contact with said pallets.

7. An assembly machine as defined by claim 3 wherein said means for clamping said pallets in a work station comprises elongated clamping pins movable axially in a direction transverse to the direction of movement of said pallets by said pin members, said clamping pins movable in response to a cam synchronized with the movement of said cross arms.

8. An assembly machine as defined by claim 4 wherein said means for clamping said pallets in a work station comprises elongated clamping pins movable axially in a direction tranverse to the direction of movement of said pallets by said pallet transfer means, said clamping pins movable in response to a cam synchronized with the movement of said means for reciprocally shifting said pallet transfer means.

9. An assembly machine as defined by claim 1 wherein said means for moving said pallet transfer means and said clamping means in synchronization comprises a set of rotatable cams with one cam adapted to reciprocally move said pallet transfer means into and out of contact with said pallets and with another cam adapted to move said clamping means into and out of contact with said pallets.

10. An assembly machine as defined by claim 6 wherein said means for moving said pallet transfer means, said elongated pins, and said clamping means in synchronization comprises a set of rotatable cams with one cam adapted to reciprocally move said pallet transfer means and said elongated pins into and out of contact with said pallets, and with another cam adapted to move said clamping means into and out of contact with said pallets.

11. An assembly machine as defined by claim 7 wherein said means for moving said pallet transfer means and said clamping means in synchronization comprises a set of rotatable cams with one cam adapted to reciprocally move said pallet transfer means into and out of contact with said pallets and with another cam adapted to move said clamping means into and out of contact with said pallets.

12. An assembly machine as defined by claim 8 wherein said means for moving said pallet transfer means, said elongated pins, and said clamping means in synchronization comprises a set of rotatable cams with one cam adapted to reciprocally move said pallet transfer means into and out of contact with said pallets and with another cam adapted to move said clamping pins into and out contact with said pallets.

* * * * *